United States Patent [19]
Weber

[11] Patent Number: 6,101,249
[45] Date of Patent: *Aug. 8, 2000

[54] AUTOMATIC CALL SCREENING TELECOMMUNICATION DEVICE

[75] Inventor: Gary N. Weber, Fair Haven, N.J.

[73] Assignee: Lucent Technologies, Inc., Murray Hill, N.J.

[ * ] Notice: This patent issued on a continued prosecution application filed under 37 CFR 1.53(d), and is subject to the twenty year patent term provisions of 35 U.S.C. 154(a)(2).

[21] Appl. No.: 08/919,019

[22] Filed: Aug. 27, 1997

[51] Int. Cl.[7] ..................................................... H04M 3/00
[52] U.S. Cl. .......................... 379/188; 379/211; 379/201
[58] Field of Search ................................ 379/188, 88.01, 379/88.03, 88.18, 88.22, 201, 210, 211, 212, 213, 214, 7, 15, 34, 88.12

[56] References Cited

U.S. PATENT DOCUMENTS

| | | | |
|---|---|---|---|
| 5,394,445 | 2/1995 | Ball et al. | 379/88.21 |
| 5,548,636 | 8/1996 | Bannister et al. | 379/201 |
| 5,712,902 | 1/1998 | Florence et al. | 379/211 |
| 5,757,889 | 5/1998 | Ohtake | 379/34 |
| 5,835,573 | 11/1998 | Dee et al. | 379/201 |

OTHER PUBLICATIONS

Bellcore GR–1512–CORE, Issue 2, Oct. 1994, A Module of LSSGR. pp. 1, 5 and 15.

*Primary Examiner*—Harry S. Hong
*Assistant Examiner*—Benny Q. Tieu
*Attorney, Agent, or Firm*—Gibbon, del Deo, Dolan, Griffinger & Vecchione

[57] ABSTRACT

A selective ring response device for a telecommunication line comprises: a ring tone detector circuit for detecting a special ring tone different from a standard ring tone, the ring tone detector circuit coupled to the communication line; an interface circuit capable of placing the communication line in an off-hook status and capable of selectively applying a switch hook flash signal to the communication line, the interface circuit coupled to the communication line; and a control circuit coupled to the ring tone detector circuit and the interface circuit, wherein the interface circuit places the communication line in the off-hook status, and at the user's request applies the flash hook signal to the communication line in response to the ring tone detector circuit detecting the special ring tone.

16 Claims, 2 Drawing Sheets

AUTOMATIC CALL SCREENING TELECOMMUNICATION DEVICE

FIELD OF THE INVENTION

The present invention relates to telecommunications and more specifically, to an automatic answering devices.

BACKGROUND OF THE INVENTION

Call forwarding is a service available in many central offices which allows an incoming call to be directed elsewhere. There are many variations on call forwarding including call forwarding on busy, call forwarding on no answer, call forwarding all calls, etc. Call forwarding is a useful feature, such as when you are going to a meeting but are expecting an important call, you can pick up your phone before you leave for the meeting and have your calls follow you. A big disadvantage with call forwarding is that many people return to their offices but forget they have forwarded their calls elsewhere. As a result, they usually miss a number of calls. Another significant disadvantage is that a user has no way to automatically screen for important calls and select those they want to receive. Call forwarding can be used to send calls to voice mail systems either immediately or after a predetermined number of rings, typically four.

When call forwarding is used in North America from a central office, the service is activated by entering in 72# and the number where the calls are to be forwarded to. To cancel the feature you enter in 73#.

Central offices now offer a feature whereby calls that are forwarded to another telephone number, an answering service, or a telemessage provider. This feature is described in detail in the document Bellcore GR-1512-CORE, Issue 2, October 1994, A Module of LSSGR. Currently a user receives a special reminder tone, 20 Hz for 400–600 millisecond, and then can place the telephone line in the off-hook position. At this point the user can monitor the call being forwarded while the calling party is unaware of their presence. A switch hook flash signal can be sent from the user if they want to connect with the calling party, which will then establish a three way call between the calling party, the call screening customer, and the remote party. Otherwise the user can hang up, which terminates the screening without the knowledge of the calling party.

Accordingly, a need exists for automatic answering in response to a special ring tone to provide automatic call screening.

SUMMARY OF THE INVENTION

In accordance with the present invention, a selective ring response device for a communication line. The device comprises: a ring tone detector circuit for detecting a special ring tone different from a standard ring tone, the ring tone detector circuit coupled to the communication line; an interface circuit capable of placing the communication line in an off-hook status and capable of applying a switch hook flash signal to the communication line, the interface circuit coupled to the communication line; and a control circuit coupled to the ring tone detector circuit and the interface circuit, wherein the interface circuit places the communication line in the off-hook status in response to the ring tone detector circuit detecting the special ring tone.

DESCRIPTION OF THE DRAWINGS

A more complete understanding of the present invention may be obtained from consideration of the following description in conjunction with the drawings in which.

DETAILED DESCRIPTION OF VARIOUS ILLUSTRATIVE EMBODIMENTS

While the present invention automatic call screening telecommunication device is especially well suited for switched wired networks, it is equally well suited for use in a wireless network, as well as a packet switching network, such as an ATM network.

A telecommunication central office can provide a feature whereby calls that are forwarded to another telephone number answering service, or telemessage provider, can be selectively screened by users. Currently a user receives a special reminder tone, 20 Hz for 400–600 millisecond, and then can place the telephone line in the off-hook position. The system can further provide a visual indication to the user that a call is being screened, such as with an LED or display. At this point the user can monitor the call being forwarded while the calling party is unaware of their presence. A switch hook flash signal can be sent from the user if they want to connect with the calling party, which will then make the connection and establish a three way call between the calling party, the call screening customer, and the remote party. Otherwise the user can hang up, which terminates the screening without the knowledge of the calling party.

Figure 1:
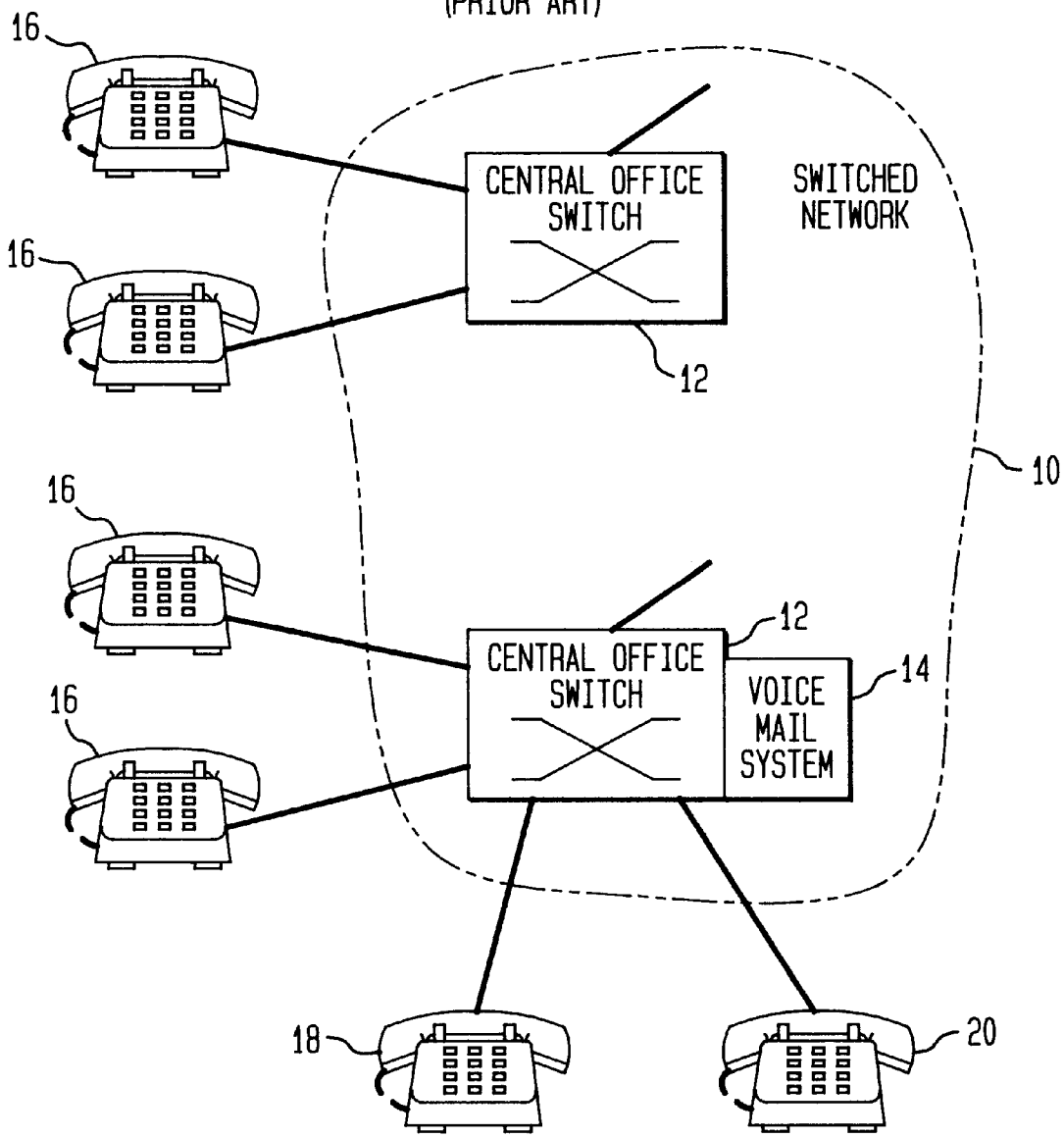
FIG. 1 is a schematic view of a prior art switched communication network.

Referring to FIG. 1 there is shown a prior art switched communication network which employs the central office feature. A switched telecommunications network 10 contains at least one central office switch 12. The central office switch may contain a voice mail system 14 as well as other optional systems. Further, the voice mail system, answer service, or telemessaging features do not have to be associated directly with the central office switch 12. A plurality of telecommunication devices 16 are connected to the switched telecommunication network 10.

When a feature user 18 activates the central office switch 12 based feature, calls directed to the feature user 18 will be forwarded to a secondary user 20 or a central office voice mail system 14. When a call is made from a telecommunication device 16 to the feature user 18 the central office switch 12 generates a special reminder tone (typically 20 Hz for 400–600 milliseconds in contrast to the standard ringing tone of 17 Hz to 20 Hz for 1 second) which is received by the feature user 18. In response to the special reminder tone the feature user 18 then manually places the telephone line into an off-hook position. At this point the feature user 18 can monitor the call being forwarded while the calling party is unaware of their presence. A switch hook flash signal can be sent from the feature user 18 to the central office switch 12 which will then establish a three way call between a telecommunication device 16, the feature user 18 and the secondary user 20 or answering service, etc. This has required the telecommunication subscriber who is the feature user 18 to manually respond (by going off hook) to the special ring in order to screen the call.

Figure 2:
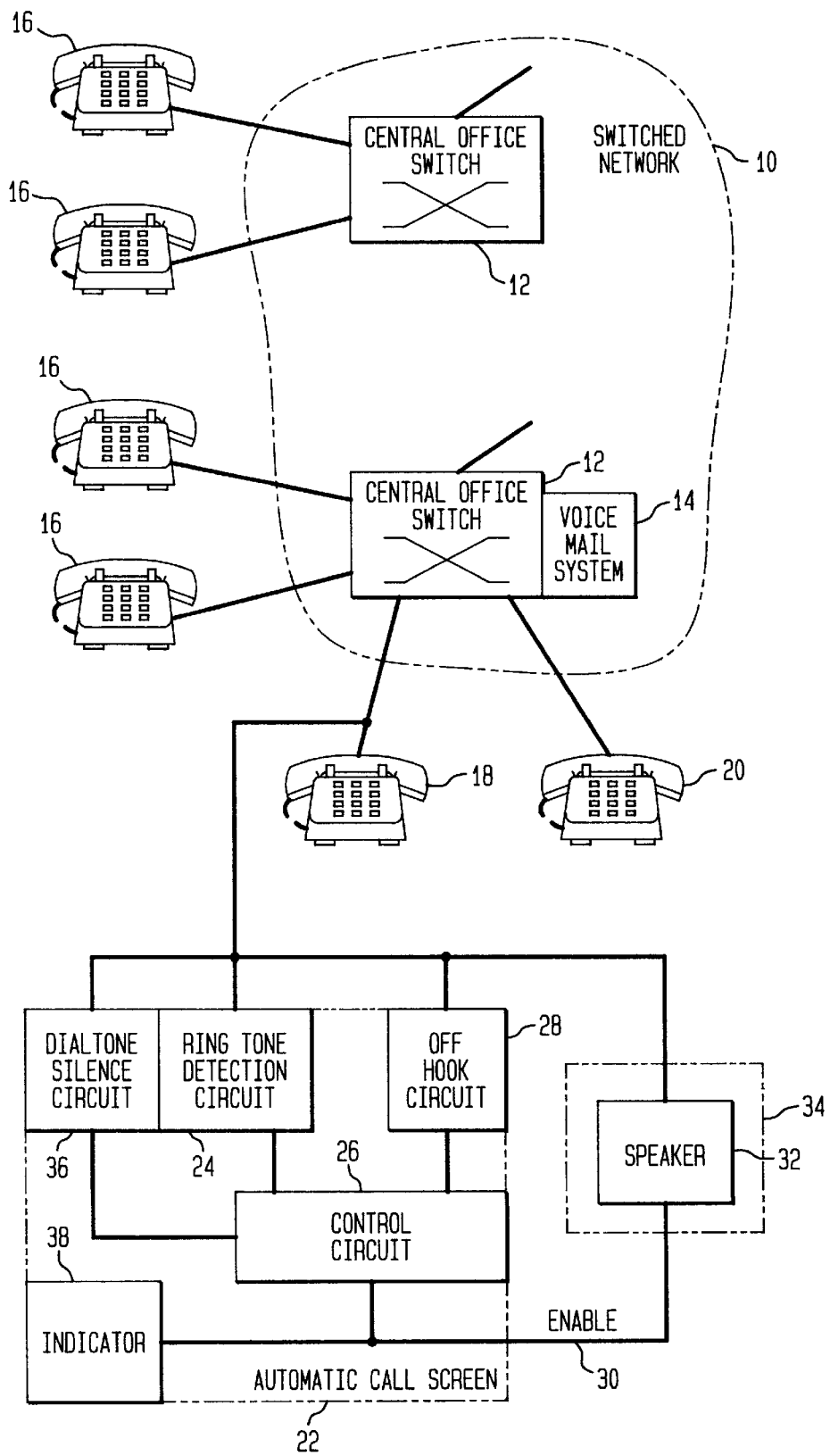
FIG. 2 is a schematic view of a switched communication network which employs the automatic call screening telecommunications device.

Referring to FIG. 2 a switched communication network which employs the central office feature and utilizes the present invention automatic call screening telecommunication device 22. Similar elements having a similar function to those shown in FIG. 1 are assigned the same reference number.

When a feature user 18 activates the central office switch 12 based feature, calls directed to the feature user 18 will be forwarded to a secondary user 20 or a central office voice mail system 14. When a call is made from a telecommunication device 16 to the feature user 18 the central office switch 12 generates a special reminder tone which is received by the feature user 18 and the present invention automatic call screening telecommunication device 22. If the feature user 18, has the present invention automatic call screening telecommunication device 22 activated, in response to the special reminder tone the automatic call screening telecommunication device 22 automatically places the telephone line into an off-hook position. At this point, the feature user 18 can monitor or screen the call via the speaker 32 without the calling party knowing. If the feature user 18 wants to intercept the call, and connect with the calling party, then in response to the feature user 18 a switch hook flash signal is then automatically sent from the automatic call screening telecommunication device 22 to the central office switch 12 which will then establish a three way call with the secondary user 20.

The feature user 18 may select to be connected with the calling party through simply pressing a connect button or by other means such as a voice response system (such as by saying CONNECT etc.).

The automatic call screening device 22 contains a ring tone detection circuit 24. The ring tone detection circuit 24, when the feature is activated, detects the special reminder tone and signals a control circuit 26. The control circuit 26 enables the off hook circuit 28 to automatically place the telephone line into an off-hook position which activates a speaker 32 which is optionally contained in a speakerphone 34. If the feature user 18 desires to connect with the calling party, a switch hook flash signal is then sent by the off hook circuit 28 to the central office switch 12 which establishes a three way call. The control circuit 26 provides an enable signal 30 which is indicative of a call having been selected to be screened. An indicator 38 can be activated in response to the enable signal 30 which would indicate that a call is being screened. The enable signal 30 is coupled a communication device such as a speakerphone 34. The microphone contained within the speakerphone 34 would be muted when a call is being screened. The communication device 32 is coupled to the telephone line and is activated in response to the enable signal 30. This will provide the equivalent call screening functionality of a typical answer machine to the caller.

It is necessary for the automatic call screening device 22 to return the line to on hook after the calling party has completed their message or optionally at the request of the feature user 18. A dial tone/silence detection circuit 36 can be utilized to detect dial tone or a period of silence when the call screening feature is activated. If the line is in the off hook state signal the control circuit 26 to have the off hook circuit 28 place the line back on hook in response to detecting dial tone or a period of silence. Optionally, the feature user 18 may select to be disconnected from monitoring/screening the calling party through simply pressing a disconnect button or by other means such as a voice response system (such as by saying HANG UP etc.).

Numerous modifications and alternative embodiments of the invention will be apparent to those skilled in the art in view of the foregoing description. Accordingly, this description is to be construed as illustrative only and is for the purpose of teaching those skilled in the art the best mode of carrying out the invention. Details of the structure may be varied substantially without departing from the spirit of the invention and the exclusive use of all modifications which come within the scope of the appended claims is reserved.

What is claimed is:

1. In a call forwarding system generating a special ring tone different from a standard ring tone indicating call forwarding, a selective ring response device for a communication line comprising:

a ring tone detector circuit for automatically detecting the special ring tone, said ring tone detector circuit coupled to the communication line;

an interface circuit capable of automatically placing the communication line in an off-hook status and capable of applying a switch hook flash signal to the communication line, said interface circuit coupled to the communication line;

a control circuit coupled to said ring tone detector circuit and said interface circuit, wherein in response to detecting the special ring tone, said interface circuit automatically places the communication line in said off-hook status and applies said flash hook signal to the communication line in response to a user's request; and an indicator activated in response to an enable signal indicative that a call is being screened;

wherein said control circuit further provides said enable signal in response to said ring tone detector circuit detecting said special ring tone.

2. The device as recited in claim 1 further comprising a speaker, said speaker is coupled to the communication line in response to said enable signal, wherein said speaker permits call monitoring.

3. The device as recited in claim 1 wherein said special ring tone is approximately 20 Hz 400–600 milliseconds.

4. The device as recited in claim 1 wherein said control circuit detects dial tone and places the communication line in an on-hook status.

5. The device as recited in claim 1 wherein said user's request is detected by a voice response system coupled to said control circuit.

6. The device as recited in claim 1 wherein said control circuit places the communication line in an on-hook status in response to a user's request detected by a voice response system coupled to said control circuit.

7. The device as recited in claim 1 further comprising a speaker telephone, said speaker telephone is coupled to the communication line and is activated in responsive to said enable signal.

8. In a call forwarding system generating a special ring tone different from a standard ring tone indicating call forwarding, a selective response telecommunication device for a telecommunication line comprising:

a ring tone detector circuit for automatically detecting the special ring tone, said ring tone detector circuit coupled to the telecommunication line;

an interface circuit capable of automatically placing the telecommunication line in an off-hook status and capable of applying a switch hook flash signal to the telecommunication line, said interface circuit coupled to the telecommunication line;

a control circuit coupled to said ring tone detector circuit and said interface circuit, wherein said interface circuit automatically places the telecommunication line in said off-hook status in response to said ring tone detector circuit detecting said special ring tone, said control circuit provides an enable signal in response to said ring tone detector circuit detecting said special ring tone, and said control circuit selectively applies said flash hook signal to the telecommunication line in response to said ring tone detector circuit detecting said special ring tone; and an indicator activated in response to said enable signal indicative that a call is being screened.

9. The device as recited in claim 8 further comprising a dial tone/silence detection circuit wherein said enable signal is not provided when said dial tone/silence detection circuit detects dial tone or silence for a predetermined interval.

10. The device as recited in claim 8 further comprising a speaker, said speaker is coupled to the communication line in response to said enable signal, wherein said speaker permits monitoring a call.

11. The device as recited in claim 8 wherein said special ring tone is approximately 20 Hz 400–600 milliseconds.

12. The device as recited in claim 8 wherein said control circuit detects dial tone and places the communication line in an on-hook status.

13. The device as recited in claim 8 wherein said flash hook signal is selectively applied when a user's request is detected by a voice response system coupled to said control circuit.

14. The device as recited in claim 8 wherein said control circuit places the communication line in an on-hook status in response to a user's request detected by a voice response system coupled to said control circuit.

15. The device as recited in claim 8 further comprising a speaker telephone having a speaker and a microphone, said speaker telephone is coupled to the communication line, said speaker is activated in responsive to said enable signal, and said microphone is muted in response to said enable signal until activated.

16. In a call forwarding system generating a special ring tone different from a standard ring tone indicating call forwarding, a selective ring response device for a communication line comprising:

a ring tone detector circuit for automatically detecting the special ring tone, said ring tone detector circuit coupled to the communication line;

an interface circuit capable of automatically placing the communication line in an off-hook status and capable of applying a switch hook flash signal to the communication line, said interface circuit coupled to the communication line;

a control circuit coupled to said ring tone detector circuit and said interface circuit, wherein in response to detecting the special ring tone, said interface circuit automatically places the communication line in said off-hook status and applies said flash hook signal to the communication line in response to a user's request detected by a voice response system coupled to said control circuit; and an indicator activated in response to an enable signal indicative that a call is being screened;

wherein said control circuit further provides said enable signal in response to said ring tone detector circuit detecting said special ring tone.

* * * * *